S. EBERHART.
COMBINATION DOMINO AND CHART DEVICE FOR SEAT WORK IN NUMBERS.
APPLICATION FILED JULY 24, 1916.
1,228,889. Patented June 5, 1917.
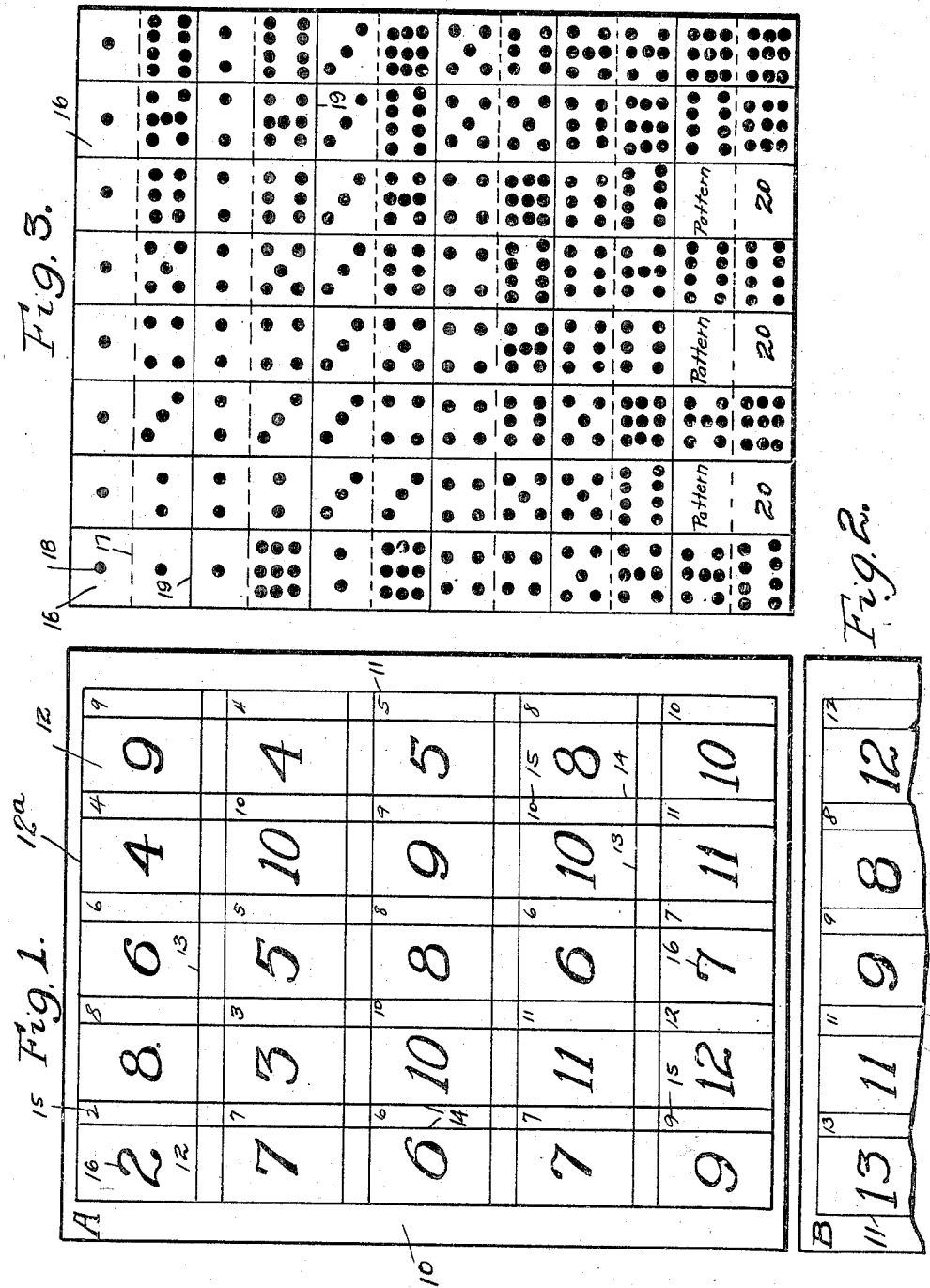

UNITED STATES PATENT OFFICE.

STELLA EBERHART, OF DES MOINES, IOWA.

COMBINATION DOMINO AND CHART DEVICE FOR SEAT WORK IN NUMBERS.

1,228,889.     Specification of Letters Patent.     Patented June 5, 1917.

Application filed July 24, 1916. Serial No. 111,098.

*To all whom it may concern:*

Be it known that I, STELLA EBERHART, a citizen of the United States, and resident of Des Moines, in the county of Polk and State of Iowa, have invented a new and useful Combination Domino and Chart Device for Seat Work in Numbers, of which the following is a specification.

The object of my invention is to present an extremely simple and inexpensive construction adapted to be used in schools for exercises and numbers while the pupils are at their seats.

A further object is to provide a device of the kind mentioned including a sheet or sheets containing the 45 sums, resulting from the addition of the first nine digits, the digits being taken in combinations of two and provided in connection therewith dominoes having dots or other indicating characters representing the various combinations of said digits. Said dominoes are preferably arranged in a sheet.

Still a further object is to provide such a device including sheets having printed thereon the sums as hereinbefore described and having spaces for each sum of substantially the same size as said dominoes and having in addition to said spaces, other spaces containing numbers corresponding to the numbers in the spaces whereby the work can be checked.

Figure 1, shows a plan view of the sheet showing the arrangement of 25 sums resulting from the addition of the primary digits and showing the spaced lines for containing the numbers used in checking the various additions.

Fig. 2, shows a plan view of the part of another of said sheets, and

Fig. 3, shows a sheet having printed thereon dominoes, bearing on their faces, dots showing the various combinations of digits.

My approved number sheets as shown in the above drawings, preferably comprise rectangular sheets made of paste board or other suitable material, which I have indicated by the reference character 10. The sheets may be provided with vertical lines 11 and horizontal lines 12ª arranged near the sides and ends of the sheets, thereby providing the border adjacent to each edge of the sheet. Certain portions of each sheet are divided into rectangular spaces 12 of substantially the same size as the dominoes hereinafter described. The spaces are indicated by the reference character 12 and are arranged in horizontal and in vertical rows. At the top and bottom of each horizontal row, is a printed line 13. The lines 13 between the respective horizontal rows of spaces are spaced from each other as clearly shown in Fig. 1. At the right hand side of each vertical row of spaces 12, are spaced lines 14 as shown in Fig. 1. The lines 14 of each adjacent pair of spaces 12 are spaced from each other a sufficient distance to receive the small indicating characters 15. In the spaces 12 are marked large indicating characters 16 representing the sums of the addition of various digits from one to nine taken in combination of two. Thus, in the sheet shown on Fig. 1, the space 12 at the upper left hand corner of the sheet has printed therein the number 2, being the sum of the addition of 1 and 1. The next space to the right has printed therein the number 8, being the sum of the addition of 1 and 7 or the sum of the addition of 4 and 4, or the sum of the addition of 2 and 6. The other spaces contain similar or other numbers. It will be noted that between the lines 14 at the right hand side of each space 12 is printed a number corresponding to the number in the space 12. For convenience sake, I have shown sheet 10 having 25 spaces 12 with numbers thereon. It is, of course, obvious that the entire 45 numbers may be printed on one sheet. I preferably use smaller sheets, as for instance two of them on account of convenience in handling them. For use with the sheets 10, I provide dominoes indicated by the reference character 16 in Fig. 3, preferably printed on sheet of card board or the like, each domino preferably has the center transverse dotted line 17 and on opposite side of the said transverse dotted line, dots or other indicating character. Thus, on the sheet shown in Fig. 3, I have shown the upper left hand domino having one dot on each side of line 17. The next domino to the right has one dot above the line and 2 dots below the line. There are 45 of the dominoes having on their faces dots or indicating characters showing the various combinations of the digits from one to nine. The dominoes are arranged in vertical and in horizontal rows as shown and between the rows are scored lines 19. By cutting on the scored lines 19 the sheet containing the dominoes may be cut up and the dominoes separated.

The blank space 20 on the sheet of Fig. 3, may be cut in the form of domino to serve as patterns if desired.

In the practical use of my improved domino and chart device the dominoes are thrown indiscriminately into a heap and the teacher instructs the pupil to select the dominoes and place them in the corresponding spaces 12 on the sheet 10, shown in Fig. 1 or sheet 11, shown in Fig. 2. Thus, the domino having two single dots is to be placed in the upper left hand space 12 on sheet 10. The domino showing one dot on one side of the line and two dots on the other side of the line, would be placed on the second space 12 from the left in the second row of spaces 12 from the top of the sheet 10 and so on.

By practice with dominoes and sheets 10 and 11 the pupils learn to quickly add the numbers represented by the dots on opposite sides of the lines 17 on the dominoes and after a time will learn to instantly associate the dots on the dominoes with the sum of the numbers which said dots represent. For instance, the pupils will learn to instantaneously recognize that the sum of 4 dots on one side of the line 17 on one domino, plus two dots on the other side of the said line, is six. The dominoes can be used over and over again and the pupils treat the work as sort of a game. The work is best done while the pupils are at their seats.

The dominoes covering the number spaces are separated from each other a sufficient distance for convenience in placing the dominoes and enabling both the pupil and teacher to check the work that has been done.

I have used a domino and chart system of this kind in the school room and have found it very serviceable for practice in number work.

Some changes may be made in the construction and arrangement of the parts of my invention without departing from the essential features and purposes thereof, and it is my intention to cover by this application, any such changes and instructions or use of mechanical equivalents which may be reasonably included within the scope of my claims.

I claim as my invention:

1. In a device of the class described, a sheet having printed thereon numbers representing the sums of the addition of two other numbers, said numbers being arranged in regular spaces, dominoes of proper size to fit in said spaces having on their faces indicating characters to represent the numbers which have been added together to produce the numbers shown on said sheet.

2. In a device of the class described, a sheet, having a plurality of spaces arranged in rows, numbers in said spaces, a smaller number marked outside of each space corresponding with the number in the space, the number in each space representing the sum of two primary numbers, and a plurality of dominoes having indicating characters representing the numbers which have been added together to find the sums represented by the numbers in the spaces on said sheet.

3. In a device of the class described, a sheet, a plurality of spaces marked off thereon, said spaces being arranged in vertical and in horizontal rows, the said rows being spaced from each other, each of said spaces having therein, indicating characters representing the sum of two numbers and similar indicating characters adjacent to each of said spaces, and a sheet having thereon dominoes having indicating characters representing numbers which may be added together to make the sums represented by the indicating characters on first sheet.

Des Moines, Iowa, July 20, 1916.

STELLA EBERHART.

Copies of this patent may be obtained for five cents each, by addressing the "Commissioner of Patents, Washington, D. C."